US006394357B1

(12) United States Patent
Altwasser et al.

(10) Patent No.: US 6,394,357 B1
(45) Date of Patent: May 28, 2002

(54) SECURITY ELEMENT FOR ELECTRONIC ARTICLE SURVEILLANCE AND METHOD OF MANUFACTURING A SECURITY ELEMENT

(75) Inventors: Richard Altwasser, Neuthard (DE); Peter Lendering, CR Terborg (NL)

(73) Assignee: Meto International GmbH, Hirschhorn (DE)

( * ) Notice: Subject to any disclaimer, the term of this patent is extended or adjusted under 35 U.S.C. 154(b) by 0 days.

(21) Appl. No.: 09/449,550

(22) Filed: Nov. 29, 1999

(30) Foreign Application Priority Data

Dec. 14, 1998 (DE) ........................................ 198 57 583

(51) Int. Cl.[7] ......................... G06K 19/06; G06K 19/00

(52) U.S. Cl. ....................................... 235/492; 235/487

(58) Field of Search ................................ 235/487, 492; 343/895; 340/572

(56) References Cited

U.S. PATENT DOCUMENTS

| | | | | | |
|---|---|---|---|---|---|
| 5,276,431 A | * | 1/1994 | Piccoli et al. | ............... | 340/572 |
| 5,291,180 A | | 3/1994 | Reeb | .......................... | 340/572 |
| 5,405,702 A | | 4/1995 | Piotrowski et al. | ......... | 428/458 |
| 5,444,223 A | * | 8/1995 | Blama | ........................ | 235/435 |
| 6,164,551 A | * | 12/2000 | Altwasser | ................... | 235/492 |

FOREIGN PATENT DOCUMENTS

| | | | |
|---|---|---|---|
| DE | 3221500 | A1 | 12/1983 |
| DE | 19604746 | A1 | 8/1997 |
| DE | 19705723 | A1 | 2/1998 |
| DE | 19708180 | A1 | 5/1998 |
| EP | 0670563 | A1 | 9/1995 |
| EP | 0762353 | A1 | 3/1997 |
| EP | 0790123 | A2 | 8/1997 |
| EP | 08079121 | A1 | 11/1997 |

* cited by examiner

*Primary Examiner*—Michael G. Lee
*Assistant Examiner*—April A. Nowlin
(74) *Attorney, Agent, or Firm*—Jones, Tullar & Cooper, P.C.

(57) ABSTRACT

The present invention relates to a security element for electronic article surveillance, having one lower and one upper conducting track with at least one winding each, the two conducting tracks being wound in opposing directions and overlapping in at least one area of overlap, and a dielectric layer in the area of overlap between the two conducting tracks. In a critical area in which a border edge of the lower and upper conducting tracks overlap, the dielectric layer is thicker than in the remaining area of overlap. The present invention also relates to a method of manufacturing such a security element.

14 Claims, 2 Drawing Sheets

SECURITY ELEMENT FOR ELECTRONIC ARTICLE SURVEILLANCE AND METHOD OF MANUFACTURING A SECURITY ELEMENT

FIELD OF THE INVENTION

This invention relates to a security element for electronic article surveillance, comprising one lower and one upper conducting track having at least one winding each, the two conducting tracks being wound in opposing directions and overlapping in at least one area of over-lap with a dielectric layer provided in the area of overlap between the two conducting tracks.

BACKGROUND OF THE INVENTION

A corresponding security element is known from German Patent DE 197 08 180 A1, for example. Security elements of this type are referred to as resonant circuits or resonant frequency security elements, the resonant frequency being determined by the capacitance C, the inductance L and the resistance R of the resonant circuit. Resonant frequency security elements in the form of labels or tags are used in the prevention and detection of theft in department stores and warehouses, and they are becoming increasingly popular as a result of their high rates of detection.

Article surveillance itself can be described briefly as follows: The resonant frequency security elements are excited by an alternating magnetic field in the interrogation zone of the area to be maintained under surveillance—this is conventionally the entrance and exit area of a department store or warehouse—so that they emit a detectable characteristic signal. Once this characteristic signal is detected by the surveillance system, an alarm is produced.

It is particularly advantageous to construct the resonant frequency security elements so that they can be deactivated. Deactivation takes place as soon as the protected article has been rightly purchased by a customer. One method that has proven successful in this connection is to produce a short-circuit between the two layers of conducting tracks by applying an accordingly high pulse of energy through the dielectric layer, thus leading to the destruction of the circuit's typical resonant characteristics.

A deactivatable security element and a suitable production method therefor are already known from European Patent EP 0 665 705 A2. In the this Patent, each of the conducting track layers is comprised of a plurality of turns. The two layers of conducting tracks are interconnected by a dielectric, very thin layer of resin. This resin layer has an essentially constant thickness over the entire area of the layers.

Deactivation of the security element takes place in this case, too, by applying a sufficiently high pulse of energy.

Although the above described resonant circuit can be deactivated easily and reliably, there is a risk of it being reactivated by the application of mechanical strain, particularly bending or twisting—in other words, short-circuiting can be canceled again by the mechanical strain. Needless to say, reactivation is a highly undesirable effect.

To counter the risk of a once deactivated resonant frequency security element being reactivated accidentally, it is proposed in the previously mentioned German Patent DE 197 08 180 A1 making the strength of the two overlapping conducting tracks so great as to cause the security element to bend, if subjected to mechanical strain, in those areas which are essentially free of conducting tracks (→zones of preferred bending). Thanks to this construction the probability of reactivating the security element can be appreciably reduced, because reactivation takes place only when the point of short-circuiting lies in the zones of preferred bending. Since these zones make up only a relatively small part of the overall area of the overlapping conducting tracks, the risk of reactivating a security element is naturally reduced to a considerable degree.

Further investigations have shown that areas in which one of the two conducting tracks crosses end areas of the other conducting track (critical area) are more susceptible to reactivation than the remaining areas of overlap. In other words: an electrical connection between the two conducting tracks—hence with deactivating effect on the resonant circuit—caused by bending or twisting of the security element is more likely to be broken when it lies in the critical area of overlap than when it occurs in the remaining area of overlap between the conducting tracks.

SUMMARY OF THE INVENTION

It is an object of the present invention to provide a security element in which the risk of reactivation after deactivation is reduced or fully eliminated.

This object is accomplished with respect to the security element of the present invention in that in a critical area in which the upper and lower conducting tracks overlap a border edge of the lower and upper conducting tracks, respectively, the dielectric layer is at least as thick as, or thicker than, in the remaining area of overlap. According to a preferred embodiment of the security element of the present invention, the dielectric layer is a dielectric adhesive layer.

As previously explained, areas in which a border edge of a conducting track is crossed by the other conducting track (critical area) are particularly susceptible to reactivation when the preceding deactivation took place in exactly these areas. It is impossible, by the way, to prevent such areas occurring in cases where two conducting tracks are wound in opposing directions.

The security element has turned out to be particularly resistant to reactivation when the sum of the lengths of the border edges is minimal in the critical area or in the critical areas or in the strip-shaped area.

In a further advantageous aspect of the security element of the present invention, it is thus proposed to provide as the additional dielectric layer a dielectric film material, a dielectric lacquer layer or an additional dielectric adhesive layer in the critical area or critical areas in addition to the dielectric adhesive layer. Alternatively, it is proposed to achieve greater thickness in the critical area or critical areas by subjecting the two conducting tracks to a lower application pressure in these areas during the lamination process.

In the event of there being several areas in which a border edge of the upper and lower conducting tracks overlap with the lower and upper conducting tracks, respectively, an advantageous embodiment of the security element of the present invention provides for these areas to be arranged essentially along a straight line in an essentially strip-shaped area. This strip-shaped area is a few millimeters wide and extends preferably over the fill length of the security element. It is an advantage of course if the width of the additional dielectric layer is coordinated with the width of the strip-shaped area.

According to a preferred embodiment of the security element of the present invention, the two conducting tracks are connected electrically in an overlapping end area. The electrical connection can be effected in various ways. Alternative possibilities are described in German Patent DE 197 08 180. The preferred method for bonding the two conducting tracks involves, in conjunction with the present invention, perforating the security element in the area of the conducting tracks in which the electrical connection is desired.

A particularly favorable method of manufacturing the security elements of the present invention involves the following process steps: A dielectric adhesive layer is applied to the lower conducting track; the critical area or the critical areas is or are coated with an additional dielectric layer which may be a dielectric film material, a dielectric lacquer layer or an additional dielectric adhesive layer; the upper conducting track is then joined to the lower conducting track in the desired position. Alternatively, provision is made for the lower and upper conducting tracks to be laminated together in the critical area or critical areas using a reduced application pressure. The laminating the two conducting tracks at a reduced application pressure can also be performed in combination with the arrangement of an additional dielectric layer in the critical area or critical areas.

In the event of mechanical production, an advantageous further aspect of the method of manufacturing the security element of the present invention provides for the upper and lower conducting tracks to be positioned each on a web material; the conducting tracks are arranged on the web material so that the critical areas are oriented in the running direction of the machine; the additional dielectric layer is applied in strip form to the lower or upper conducting track, as applicable, before the two conducting tracks are laminated together.

An advantageous embodiment of the method for manufacturing the security elements of the present invention provides for the additional dielectric layer to be applied to the upper or lower conducting track as a dielectric lacquer layer by spraying or printing. If an additional dielectric adhesive layer is involved, it is preferably applied to the upper or lower conducting track by means of extrusion.

The present invention will be explained in more detail in the following with reference to the accompanying drawing.

DESCRIPTION OF THE PREFERRED EMBODIMENT

Figure 1:
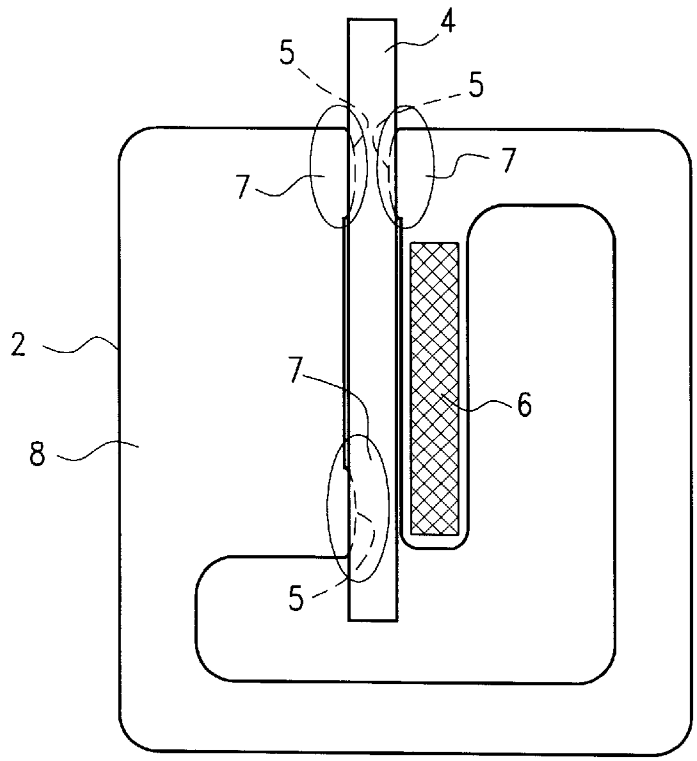
FIG. 1 is a plan view of the lower conducting track in accordance with a preferred embodiment of the security element of the present invention.
Figure 2:
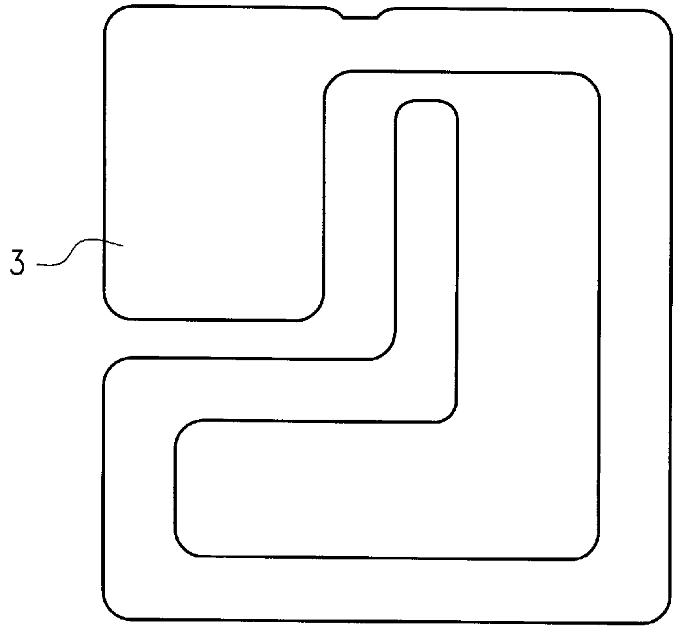
FIG. 2 is a plan view of the upper conducting track in accordance with a preferred embodiment of the security element of the present invention.
Figure 3:
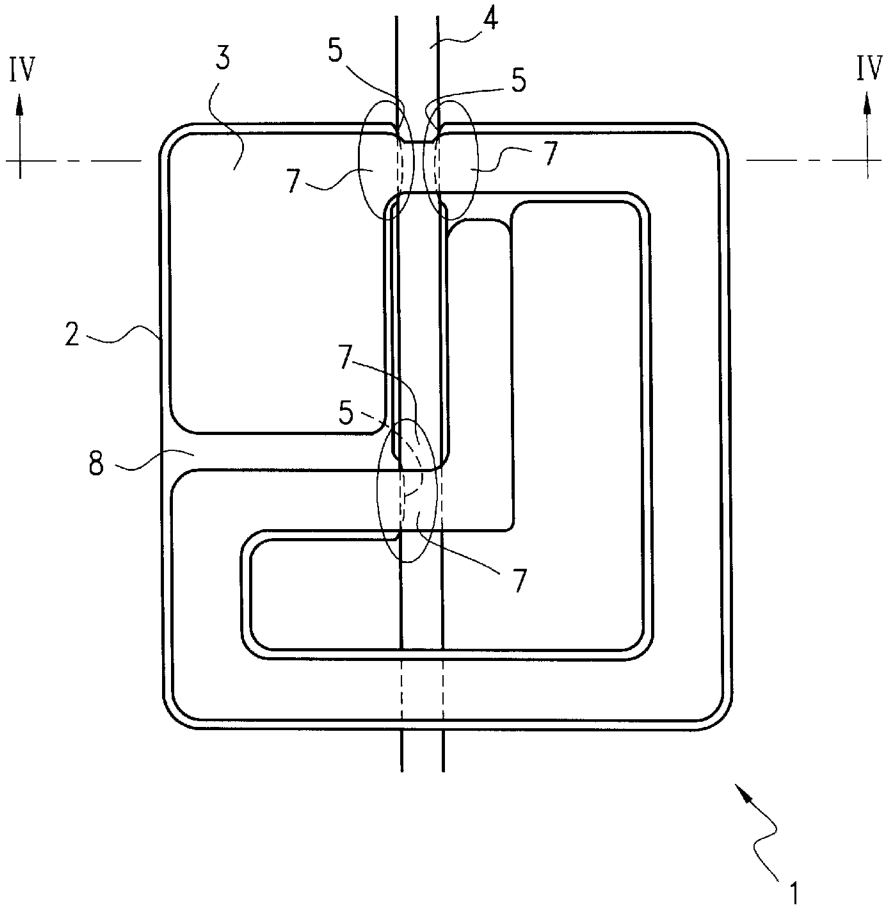
FIG. 3 is a plan view of the preferred embodiment of the security element of the present invention, which is composed of the conducting tracks illustrated in FIGS. 1 and 2.

FIG. 1 shows a plan view of a lower conducting track 2, on which a dielectric adhesive layer 8 is coated, and FIG. 2 shows a plan view of an upper conducting track 3. The security element 1 of the present invention shown in FIG. 3 is comprised of the two conducting tracks 2, 3 which are connected electrically at an overlapping end area 6. According to a preferred embodiment of the security element 1 of the present invention, the conducting tracks are punched out of an aluminum foil. The manufacturing process for the production of the security element 1 of the present invention is relatively economical because the two conducting tracks 2, 3 are relatively wide and have essentially only one turn. Thanks to these dimensions, the security element of the present invention is also notable for its high stability.

In the embodiment of the present invention illustrated in FIG. 1, an additional dielectric layer 4, which is this embodiment is of a strip-shaped configuration does not extend over the full length of the security element.

Figure 4A:
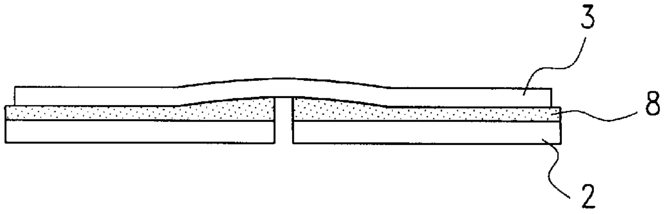
FIG. 4*a* is a cross sectional view taken along lines IV—IV of FIG. 3.
Figure 4B:
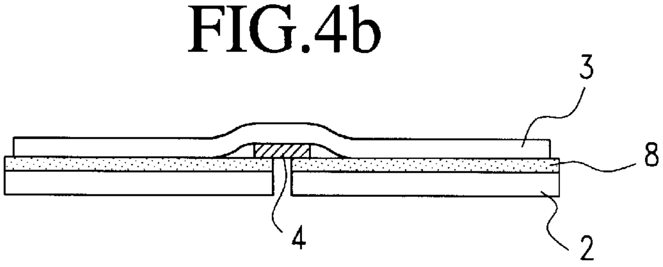
FIG. 4*b* is a similar view to FIG. 4*a* except that an additional dielectric layer is omitted and replaced by a thickening of a dielectric adhesive layer.

The two conducting tracks 2, 3 have one winding each and are wound in opposing directions. One result of this arrangement is that border edges 5 of the lower conducting track 2 are bound to be crossed by the upper conducting track 3. The security element 1 shown in FIGS. 1 and 3 have three critical areas 7 defined, in which border edges 5 of the lower conducting track 2 are crossed by the upper conducting track 3. The security element shown in FIG. 3 is constructed so that these three critical areas 7 come to lie essentially along a straight line in a closely defined strip-shaped area, corresponding to the strip-shaped area of the additional dielectric layer 4. An additional dielectric layer 4 is inserted in this strip-shaped area in addition to the already existing dielectric adhesive layer 8 insulating the two conducting tracks 2, 3 from each other as shown in FIG. 4*b,* or alternatively both conducting tracks 2, 3 are laminated together in the critical areas using a reduced application pressure to provide the embodiment according to FIG. 4*a* where the dielectric adhesive layer 8 has a greater thickness in the critical area than in the remaining area of overlap. In the embodiment shown, the additional dielectric layer 4 is a dielectric film material made preferably of PET. It is also possible to use dielectric lacquers or dielectric adhesives for this purpose.

According to the method aspect of the present invention, in the event of mechanical production, the upper conducting track 3 and the lower conducting track 2 are each positioned on a web material, such that the critical areas 7 are oriented in the running direction of the machine. And the additional dielectrical layer present in the form of dielectric strip-shaped film material, dielectric lacquer layer or an additional dielectric adhesive layer is applied in strip form to either the lower conducting track 2 or the upper conducting track 2.

What is claimed is:

1. A security element for electronic article surveillance, comprising:

a lower conducting track;

an upper conducting track; and a dielectric layer, wherein:

said lower conducting track and said upper conducting track having at least one winding, wound in opposite directions, and overlapping in at least one area of overlap, said dielectric layer being located in the area of overlap between said two conducting tracks, a critical area is defined in each area of overlap by a border edge of said lower conducting track, and said dielectric layer is one of at least as thick as, and thicker than the remaining area of overlap.

2. The security element as defined in claim 1, wherein said dielectric layer comprises a dielectric adhesive layer.

3. The security element as defined in claim 2, further comprising:

an additional dielectric layer located in at least one of said critical areas, said additional dielectric layer comprising one of dielectric film material, lacquer layer and further dielectric adhesive layer.

4. The security element as defined in claim 1, wherein said lower conducting track and said upper conducting track are subjected to a reduced application pressure in at least one of said critical areas during the production process.

5. The security element as defined in claim 1, wherein a plurality of critical areas are defined which are arranged essentially along a straight line in a strip-shaped area.

6. The security element as defined in claim 1, wherein the sum of the lengths of said border edges in said critical areas is minimal.

7. The security element as defined in claim 3, wherein the width of said additional dielectric layer is coordinated with that of said dielectric layer, and extends over the full length of the security element.

8. The security element as defined in claim 3, wherein said additional dielectric layer comprises dielectric film material of PET.

9. The security element as defined in claim 1, wherein said lower conducting track and said upper conducting track are connected electrically in an overlapping end area.

10. A method of manufacturing a security element, comprising the steps of:

providing two conducting tracks defined as a lower conducting track and an upper conducting track;

applying a dielectric adhesive to one of said two conducting tracks; and laminating the two conducting tracks and the dielectric adhesive defining thereby at least one critical area, said lamination using a reduced application pressure at the at least one critical area, wherein:

the at least one critical area is coated with the dielectric adhesive which comprises one of a dielectric film material, a dielectric lacquer layer, and additional dielectric adhesive.

11. The method as defined in claim 10, further comprising the step of:

positioning the lower conducting track and the upper conducting track on a web material such that the at least one critical area is oriented in the running direction of a machine employed in the production of the security element, wherein:

the dielectric adhesive comprises an additional dielectric layer in the form of one of: dielectric strip-shaped film material, dielectric lacquer layer and additional dielectric adhesive layer, applied in strip form to one of the lower conducting track and the upper conducting track.

12. The method as defined in claim 10, wherein the dielectric adhesive comprises a dielectric lacquer layer, said dielectric lacquer layer being applied by spraying.

13. The method as defined in claim 10, wherein the dielectric adhesive comprises a dielectric lacquer layer, said dielectric lacquer layer being applied by printing.

14. The method as defined in claim 10, wherein said dielectric adhesive is applied by extrusion.

* * * * *